United States Patent [19]

Flanagan et al.

[11] Patent Number: 4,801,397
[45] Date of Patent: Jan. 31, 1989

[54] PEELABLE SOLVENT-BASED COATING REMOVER

[75] Inventors: Kenneth J. Flanagan, Arlington; John B. Reed; A. Denise Lott, both of Memphis, all of Tenn.

[73] Assignee: W.M. Barr & Co., Inc., Memphis, Tenn.

[21] Appl. No.: 104,549

[22] Filed: Oct. 1, 1987

Related U.S. Application Data

[63] Continuation of Ser. No. 913,848, Sep. 30, 1986, abandoned.

[51] Int. Cl.[4] .................................................. C11D 7/52
[52] U.S. Cl. .......................................... 252/154; 134/4; 134/38; 252/165; 252/166; 252/168; 252/171; 252/172; 252/DIG. 8
[58] Field of Search ................ 252/165, 166, 168, 171, 252/172, DIG. 8, 154; 134/4, 38

[56] References Cited

U.S. PATENT DOCUMENTS

| 1,181,361 | 5/1916 | Wessel | 252/125 |
| 1,495,547 | 5/1924 | Clark | 252/119 |
| 3,079,284 | 2/1963 | Boucher | 134/4 |
| 3,979,219 | 9/1976 | Chang et al. | 134/38 |
| 4,309,322 | 1/1982 | Desmarais | 252/171 |
| 4,426,250 | 1/1984 | Brailsford | 156/655 |
| 4,502,891 | 3/1985 | Brocklehurst et al. | 134/4 |
| 4,579,627 | 4/1986 | Brailsford | 252/DIG. 8 |

FOREIGN PATENT DOCUMENTS

| 132059 | 8/1983 | Japan | 134/38 |
| 000373 | 1/1985 | World Int. Prop. O. | 134/38 |

Primary Examiner—Robert A. Wax
Attorney, Agent, or Firm—Finnegan, Henderson, Farabow, Garrett & Dunner

[57] ABSTRACT

A fiber-containing, peelable, solvent-based coating remover that may be applied to a wide variety of coatings and substrates, which can be easily removed by peeling, and which can cling to the underside of a horizontal substrate or to a vertical overhead substrate substantially without dripping.

28 Claims, No Drawings

PEELABLE SOLVENT-BASED COATING REMOVER

This application is a continuation, of application Ser. No. 06/913,848, filed Sept. 30, 1986, now abandoned.

BACKGROUND OF THE INVENTION

1. Field of the Invention

The present invention relates to a fiber-containing peelable solvent-based coating remover that may be applied to a wide variety of coatings and substrates and which can be easily removed by peeling and without more than about 10–20%, preferably, substantial, readhesion of the removed coating to the originally coated surface. Coating removers of the present invention can cling to the underside of a horizontal substrate, such as an overhead surface, or to a vertical substrate, without substantially dripping away therefrom.

2. Description of Related Art

Protective or decorative coatings such as paint, paint primers, varnish and other natural or synthetic coatings are applied to a wide range of substrates including metal, wood, artificial wood surfaces, brick, glass and concrete. When a coating deteriorates or when a new coating is desired for aesthetic reasons, the original coating frequently must be removed before a new coating is applied.

Development of new synthetic coating materials has created a need for more versatile coating removers that are effective in removing the wide range of new synthetic coatings and which will not harm the substrates. Moreover, increased awareness of the harmful effects of prolonged exposure to wet, volatile solvents has increased the need for safer solvent-based systems.

There are two principal kinds of coating removers, caustic alkali systems and solvent-based systems. Early coating removers typically used alkalies such as caustic soda, potash and soda ash as the primary ingredient. Alkali systems sometimes included other ingredients such as mineral spirits, turpentine and benzene. These alkali coating removers did an adequate job in removing natural shellacs, varnishes and resins. Their ability to remove modern synthetic coatings, however, is inferior and caustic alkali solutions frequently damage substrates to which the coatings are applied. For instance, caustic alkali formulations have been known to stain wood substrates, degrade fibrous material in substrates and etch metal substrates.

To overcome some of these disadvantages, cloth-caustic alkali systems were developed in which liquid caustic soda is painted directly onto a coating to be removed and a cloth is placed over the caustic soda solution. After standing overnight, the dried caustic and coating are removed by removing the cloth from the surface. Under proper conditions, the coating sticks to the cloth and is removed without damage to the substrate.

The utility of this system is limited, however, since it can only be used on a relatively small number of coatings attacked by caustic formulations and only a few square feet of substrate can be treated at one time. Treating larger areas is impractical due to the time and expense involved in using cloth for one area and then cleaning the cloth for use on a different area. Large cloths, of course, would be difficult to use and clean.

An improvement on the caustic system is disclosed in U.S. Pat. No. 4,502,891 which describes aqueous solutions of caustic coating remover which include caustic, chalk and natural or synthetic fibers. The aqueous product dries to a peelable coating and the paint is removed in dry form. The disadvantage of this system, like the cloth-caustic system, is that it is limited to attacking only certain coatings and frequently may damage the substrate. Accordingly, caustic systems are not sufficiently versatile for removing a wide variety of modern synthetic coatings and continue to cause damage to substrates. They also do not cling well to overhead or vertical surfaces, thereby impairing their effectiveness for removing coatings from overhead and vertical surfaces.

The disadvantages of solvent-based removers are well-known to those who routinely use such products. Conventional solvent-based coating removers are typically less effective on vertical and overhead surfaces such as ceilings and walls than on surfaces which support the coating remover, such as floors, because conventional coating removers often drip away from vertical and overhead surfaces in amounts sufficient to impair their effectiveness.

In an attempt to solve these problems, viscosity builders have been added to solvent-based formulations, but the ability of these formulations to cling to vertical and overhead surfaces remains inadequate. Typically, for instance, an amount of about 50% of conventional solvent-based coating removers may drip away from overhead surfaces, thereby reducing the amount of solvent available to remove the coating. The amount which drips away, of course, also depends on other factors such as the thickness of the coating remover applied to an overhead or vertical surface.

Usually, a solvent-based paint remover is spread onto a coated substrate in one direction with a paint brush or roller. Sufficient time is then allowed to permit the solvents to loosen the coating from the substrate surface. With conventional solvent-based coating removers, some deposed coating typically readheres to the substrate if the remover is left on the substrate and coating for too long a time. Accordingly, conventional coatings are ordinarily removed while still wet since allowing them to dry results in undesirable readhesion of the coating to the substrate. Ordinarily, therefore, the coating and coating remover are scraped away from the substrate as a slushy mixture or washed away from the substrate with a solvent or water. Workers are necessarily exposed to the solvent vapors of conventional coating removers which are not allowed to dry.

Prolonged exposure to the solvents in a solvent-based system may irritate a worker's eyes, skin and lungs. Even in good ventilation, workers in a limited space with wet solvents for extended periods of time may be exposed excessively to solvent vapor fumes. To minimize exposure of workers to solvent fumes, only small areas of a job may be done at a time.

Exposure is also encountered when the worker is scraping the slushy mixture of the coating and remover from the substrate. When removing coatings from overhead or vertical surfaces, eye and skin contact must be carefully guarded against by wearing protective clothing and masks to prevent contact of the wet active solvents.

Moreover, once a worker has applied a coating remover, he must observe the remover from time to time to make sure that excessive evaporation does not occur. Excessive solvent evaporation may lead to readhesion of the coating to the surface thereby defeating the efforts to remove the coating. The constant need to oberve the work surface and the need to limit a worker's exposure to the solvents in a given period of time increases the labor cost of coating removal.

Mixtures of solvent-based coating removers and removed coatings often take days to dry when large amounts of these wastes are collected together. In addition to the problems associated with exposing workers to the fumes from these wet solvents and coatings, disposal of the solvents into a sewer is prohibited by many cities and states for environmental reasons. Wet mixtures of coating removers and coatings must therefore be stored in special containers and delivered to an approved company for disposal.

To overcome some of the drawbacks of solvent-based coating removers, attempts have been made to formulate a solvent system with an inorganic powder. The solvent-based remover is combined with the powder applied to the coating and allowed to dry overnight. The dried coating remover and coating must then be scraped from the surface. The removed coating, for instance, paint, adheres to the inorganic powder and can be scraped from the surface of the substrate in dried form.

The dried powder, however, often adheres to the substrate that the coating was applied to. This requires additional scraping which increases the number of scrape marks and may also damage the substrate. This disadvantage limits the utility of the powder formulations in applications such as fine furniture, particularly furniture with curved surfaces.

Furthermore, the dried powdered method is not satisfactory for removing material from overhead and vertical surfaces since the dried material comes off as a powder which remains in the ambient air. Therefore, when the dried coating and powder are scraped off, the powder may enter the worker's eyes or respiratory system.

The present invention provides a solvent-based coating remover with a number of improved properties. Solvent-based coating removers made in accordance with the present invention can dry to form a peelable combination of deposited coating, fibers and binder without permitting more than about 10–20% of the deposed coating to readhere to the substrate from which the deposed coating is removed.

Coating removers of the present invention can cling to the underside of a horizontal substrate or to a vertical substrate substantially without dripping away from the overhead or vertical surface when applied in an amount sufficient to depose the coating. The present invention also provides a coating remover with improved clinging characteristics and which typically has from at least about 10% to 300% less material drip away from overhead and vertical surfaces than conventional coating removers. Coating removers of the present invention are also easier than conventional coating removers to remove from substrates.

Specifically, the coating being removed and the coating remover of the present invention can be removed with less damage to the substrate than has been possible with conventional coating removers. Moreover, coating removers of the present invention can be more effective than conventional coating removers on a larger variety of substrates and can be easier to dispose of after use.

SUMMARY OF THE INVENTION

The present invention is a peelable solvent-based coating remover for removing a coating from a coated substrate comprising a solvent-based coating remover containing (a) binder; (b) a solvent; and (c) fibers in an amount sufficient so that after said remover is applied to said coated substrate and after said coating is removed, said remover dries without more than about 10–20%, preferably, substantial, readhesion of said coating to said substrate, and provides a dry combination of coating and solvent-based coating remover which may be peeled away from the coated surface.

The invention is further defined as a process for making a peelable solvent-based coating remover comprising the steps of adding fiber to a coating remover containing a binder and a solvent in an amount sufficient so that after said fiber-containing remover is applied to a coated substrate and after said coating is removed, said remover dries without more than about 10–20%, preferably, substantial, readhesion of said coating to said coated substrate and provides a dry combination of coating and solvent-based coating remover which may be peeled away from the coated surface.

DETAILED DESCRIPTION OF THE INVENTION

In accordance with the present invention, a peelable solvent-based coating remover is provided by combining a solvent-based coating remover with natural or synthetic fibers. The fibers are added in an amount sufficient to provide a dry combination, such as a mat, of coating and solvent-based coating remover which may be peeled away from the coated surface when the solvent-based coating remover dries. The mat includes fibers, binders, the removed coating and other residues of the remover. It has been found that the deposed coating can remain associated with the fibers, binder and remover residues without readhering to the substrate even when the coating remover is allowed to dry.

With conventional solvent-based coating removers, a large amount of a deposed coating may readhere to a substrate when the coating remover is allowed to dry. With some coatings, such as acrylics, for instance, up to about 90% of the deposed coating may readhere if the remover is allowed to dry. With the present invention readhesion of at most about 10%–20% of deposed coating occurs and usually the deposed coating and remover can be removed without any substantial readhesion of the coating.

The drying time required to provide a dry peelable combination, such as a mat, will necessarily depend upon the formulation and relative amounts of materials in the solvent-based coating remover. The time needed to dry a particular formulation will be the time required for the solvents to evaporate, leaving the deposed coating bound to the fibers and binder.

Ordinarily 85%–95% of the solvent in the remover must be evaporated for the coating composition of the present invention to be considered dry and to obtain the full benefits of the present invention and preferably the solvent is completely evaporated. For preferred commercial embodiments of the present invention, drying time typically is from about 4 to 8 hours at 75° F. The required drying time will be shorter if drying occurs at higher temperatures and longer if drying occurs at lower temperatures.

The fibers of the present invention are preferably selected so that they do not inhibit the evaporation of solvent from the solvent-based coating remover. Fibers which soak up solvent to the extent that they substantially slow the drying time of the coating remover perform a function ordinarily performed by fillers or wetting agents and may not be preferred, depending, of course, on drying time considerations.

Representative fibers found useful in the present invention include sisal, tampico, swine hair, polypropylene, polyethylene, fiberglass, nylon, textile fibers, wool, cotton and corn silk. Tampico and sisal fibers are the preferred fibers in the present invention. The list of useful fibers, however, is not limited to the foregoing substances and the advantages of the present invention may be achieved with other natural or synthetic fibers.

It has been found that addition to a solvent-based coating remover of fibers preferably having a length from about 1/16" to about 5" so that the fiber is preferably from about 0.1% to 5.0% by weight of the fiber-containing solvent-based coating remover produces acceptable results. In a preferred embodiment of the invention, fibers ranging in length from about ¼" to about 1" are present in an amount from about 1% to 2.0%, more preferably 1.5% to 2.0%, by weight of the solvent-based coating remover.

Solvent-based coating removers are well-known and generally operate by altering the chemical or physical integrity of a coating, thereby loosening the coating from the substrate. Typically, solvent-based coating removers include solvent or mixtures of solvents, synthetic or natural binders, evaporation retarders, inorganic or organic wetting agents, viscosity builders, activating agents and corrosion inhibitors. Solvent-based coating removers ordinarily contain from about 80% to 99% solvent by weight of the solvent-based remover (w/w).

To provide the versatility required by the wide range of synthetic coatings now available, solvents and mixtures of solvents are frequently selected for particular applications. The solvent content of preferred solvent-based coating remover for modern coatings such as paint can include from about 10%–90% by weight of the total solvent content of chlorinated solvents such as methylene chloride and 1,1,1,-trichloroethane, 10%–50% by weight of the total solvent content of ketone solvents such as acetone or methyl ethyl ketone; 5%–50% by weight of the total solvents content of alcohol such as methanol, ethanol or isopropyl alcohol, or 5%–50% by weight of the total solvent content of aromatic solvents such as toluene, xylene and aromatic blends. Other considerations in formulating a solvent-based coating remover include safety, cost and compatibility with other ingredients of the coating remover.

Evaporation retarders are often added to coating removers in amounts ranging from about 0.1%–4.0% (w/w) to slow down the evaporation of the solvents until the solvent has time to attack the coating. Examples of commonly used evaporation retarders are paraffin wax, montan, beeswax, vegetable wax and petroleum wax. Paraffin waxes are preferred for most paint removers.

Viscosity builders are added to coating removers to enhance the performance of the coating removers in specific situations, such as overhead applications. Viscosity builders are usually derivatives of cellulose treated to provide functional groups that enable the viscosity builders to combine physically with the solvent to increase the body of the solvents. A viscosity builder enhances the ability of the coating remover to cling to overhead and vertical surfaces so that the remover will not fall away from the coating until it has had a chance to remove the coating. However, as described above, viscosity builders have not proven adequate to allow a formulation to cling to overhead and vertical srfaces. Typical viscosity builders include methylcellulose, propylcellulose, natural gums and some synthetic polymers. They are ordinarily present in coating removers in amounts ranging from about 0.10% to 4.0% w/w.

Binders are natural or synthetic materials which hold together residues of dried paint removers. In the present invention binders apparently bind the fibers together and bind the deposed coating to the fibers. The binders combined with the fibers thereby help prevent the readhesion of the deposed coating onto the substrate. Representative binders found useful in the present invention include ARKON P100 TM binder, a hydrocarbon resin produced by Arakawa Chemical, Inc., PICCOTEC LC TM binder, an methyl styrene/vinyl toluene copolymer produced by Hercules and ESCOREZ 5320 TM binder, a hydrogenated petroleum hydrocarbon resin produced by EXXON ®. Binders are preferably used in coating removers of the present invention in amounts from about 1.0–5.0 (w/w) but other suitable formulations may contain up to about 10% (w/w) binder.

Wetting agents or fillers, such as sodium sulphate and calcium carbonate, are frequently added to solvent-based coating removers. Fillers and wetting agents, which may be organic or inorganic but are most often inorganic material, usually work by absorbing the solvents to slow the release or evaporation of the solvents. The slowed release increases the contact time of solvents on the coating. One skilled in the art can readily select an amount of wetting agent or filler to achieve as appropriate drying time of the solvent. Fillers also provide bulk to coating removers inexpensively and are usually present in amounts from about 0.10% to 10% (w/w).

Activating agents are optional ingredients which coact with the solvents to enhance the effectiveness of the solvent in removing the coating. Generally, activating agents include amines, such as ammonia, isopropylamine, monoethanol amines, triethanol amines and triethyl amines; acids, such as formic acid, polyacrylic acids, citric acid, acetic acid and other carboxylic acids; phenols and alkali. Activating agents are typically present in small amounts, for instance, about 0.10–20% by weight of the solvent-based coating remover.

Finally, a corrosion inhibitor or a combination of corrosion inhibitors is preferably included in the coating removers applied to metal in amounts from about 0.1% to 3.0% (w/w). A corrosion inhibitor found particularly useful in the present invention is a combination of lithium chromate and sodium chromate. Other corrosion inhibitors include filming amines, morpholine and triethanol amine.

In any event, solvent-based coating removers are well-known to those skilled in the art and are commercially available. One skilled in the art could readily formulate a solvent-based coating remover without engaging in undue experimentation.

For example, in a conventional process for the production of a coating remover, solvent, binder, evaporation retarder, wetting agent and thickeners are combined by mixing. The combined fluid is then permitted to thicken. It is then ordinarily packaged in appropriate containers for sale.

To make a peelable solvent-based coating remover in accordance with the present invention, applicants preferably add fiber after a solvent-based coating remover has been thickened. The fiber may be added, however, at other stages during the formulation of the solvent-based coating remover. The combined coating remover and fiber are stirred until the fiber is uniformly dispersed throughout the coating remover.

Embodiments of applicant's invention are described in greater detail in the following examples.

EXAMPLE I

This example illustrates preparation of fiber-containing solvent-based coating removers using a Methylene Chloride Solvent System Activated with Ammonia.

Part A

Into a 5-gallon plastic container were charged 10,452 grams (75.3 parts by weight) of Methylene Chloride, a solvent, and 700 grams (5.0 parts by weight) of Toluene, a solvent. To this mixture were added 140 grams (1.0 part by weight) Exxon® 5320 Resin, a hydrocarbon resin acting as a binder. The ingredients were then allowed to stir 5-10 minutes until all of the resin was dissolved. The materials were stirred and 238 grams (1.7 parts by weight) of Hydroxymethyl Cellulose, a viscosity builder, and 140 grams (1.0 part by weight) of melted Paraffin wax, an evaporation retarder, were added. To this mixture were added 714 grams (5.1 parts by weight) of Diatomaceous earth, a filler. When the product was homogeneous (5-10 minutes), 280 grams (2.07 parts by weight) of concentrated Ammonium Hydroxide, an activating agent, 546 grams (3.9 parts by weight) of Methyl Alcohol, a solvent and 700 grams (5.0 parts by weight) of Isopropyl Alcohol, a solvent, were added. The formulation was allowed to stir for 20 minutes, during which time an increase in viscosity was noted. The viscosity was found to be 4450 centipoises using a Brookfield viscometer, #4 spindle at 12 rpm. The specific gravity at 75° F., using a hydrometer, was found to be 1.203. The mixture was a turbid off-white color.

A-1 Formula

To 490 grams (98 parts by weight) of Part A were added 10.0 grams (2.0 parts by weight) of sisal fibers cut to ¼" lengths. The formulation was stirred until the fibers were distributed evenly throughout the liquid.

A-2 Formula

To 490 grams (98 parts by weight) of Part A were added 10.0 grams (2.0 parts by weight) of sisal fibers cut to ½" lengths. The formulation was stirred as in A-1.

A-3 Formula

To 490 grams (98 parts by weight) of Part A were added 10.0 grams (2.0 parts by weight) of Tampico fibers cut to ¼" lengths. The formulation was stirred as in A-1.

A-4 Formula

To 490 grams (98 parts by weight) of Part A were added 10.0 grams (2.0 parts by weight) of Tampico fibers cut to ½" lengths. The formulation was stirred as in A-1.

A-5 Formula

To 492.5 grams (98.5 parts by weight) of Part A were added 7.5 grams (1.5 parts by weight) of Tampico fibers cut to ¼" lengths. The formulation was stirred as in A-1.

A-6 Formula

To 492.5 grams (98.5 parts by weight) of Part A were added 7.5 grams (1.5 parts by weight) of 0.010" diameter polypropylene fibers cut to ¼" lengths. The formulation was stirred as in A-1.

A-7 Formula

To 490 grams (98 parts by weight) of Part A were added 10 grams (2.0 parts by weight) of 0.010" diameter polpropylene fibers cut to ¼" lengths. The formulation was stirred as in A-1.

A-8 Formula

To 492.5 grams (98.5 parts by weight) of Part A were added 7.5 grams (1.5 parts by weight) of 0.012" diameter polypropylene fibers cut to ½" lengths. The formulation was stirred as in A-1.

A-9 Formula

To 490 grams (98 parts by weight) of Part A were added 10.0 grams (2.0 parts by weight) of 0.012" diameter polypropylene fibers cut to ¼" lengths. The formulation was stirred as in

A-10 Formula

To 490 grams (98 parts by weight) of Part A were added 10.0 grams (2.0 parts by weight) of 0.014" diameter polyethylene fibers cut to ¼" lengths. The formulation was stirred as in A-1.

A-11 Formula

To 490 grams (98 parts by weight) of Part A were added 10.0 grams (2.0 parts by weight) of fiberglass 0.002 microns thick, 0.06 microns wide and cut to ¼" lengths. The formulation was stirred as in A-1.

A-12 Formula

To 490 grams (98 parts by weight) of Part A were added 10.0 grams (2.0 parts by weight) of fiber glass 0.002 microns thick, 0.06 microns wide and cut to ½" lengths. The formulation was stirred as in A-1.

A-13 Formula

To 490 grams (98 parts by weight) of Part A were added 10.0 grams (2.0 parts by weight) of swine hair cut to 1.0" lengths. The formulation was stirred as in A-1.

A-14 Formula

To 490 grams (98 parts by weight) of Part A were added 10.0 grams (2.0 parts by weight) of Nylon cut to ¾" lengths. The formulation was stirred as in A-1.

A-15 Formula

To 490 grams (98 parts by weight) of Part A were added corrosion inhibitors in the form of sodium chromate (0.1 gram (0.02 parts by weight)), lithium chromate (0.05 grams (0.01 parts by weight)) and sisal fibers (10.0 grams (2.0 parts by weight)) cut to ½" in length.

EXAMPLE II, PART A

Part A

This example illustrates a neutral Methylene Chloride based paint remover with fibers added in accordance with the present invention. Into a 6000 ml stainless steel beaker were charged 3,765 grams (75.3 parts by weight) of Methylene Chloride, a solvent, 250 grams (5.0 parts by weight) of Toluene, a solvent and 50 grams (1.0 part by weight) of hydrocarbon resin acting as a binder. The mixture was allowed to stir for 10–20 minutes until all of the resins were dissolved. While stirring 85 grams (1.7 parts by weight) of Hydroxymethyl Cellulose, a viscosity builder, 50 grams (1.0 part by weight) of wax, an evaporation retarder, and 255 grams (5.1 parts by weight) of Diatomaceous earth, a filler, were added. The formula was allowed to stir until the contents were homogeneous and then 195 grams (3.9 parts by weight) of Methyl Alcohol, a solvent, and 250 grams (5.0 parts by weight) of Isopropyl Alcohol, a solvent, were added. The mixture was stirred for 20 minutes during which time the mixture became much more viscous. The viscosity, using a Brookfield Viscometer, #4 spindle at 12 rpm, was found to be 4,700 centipoises and the specific gravity at 75° F. was 1.203. The formula was a turbid off-white color.

Example II, A-1

To 490 grams (98 parts by weight) of Example II, Part A, were added 10.0 grams (2.0 parts by weight) of sisal fibers cut to ¼" lengths. The formulation was then stirred for 10–20 minutes until it was homogeneous.

Example II, A-2

This formulation illustrates a phenol activated paint remover with fibers added in accordance with the present invention. To 480 grams (96 parts by weight) of Example II, Part A were added 10.0 grams (2.0 parts by weight) of sisal fibers cut to ¼" lengths and 10.0 grams (2.0 parts by weight) of phenol. The mixture was stirred until the formulation was homogeneous.

Example II, A-3

This formulation illustrates an acid activated coating remover with fibers added in accordance with the present invention. To 480 grams (96 parts by weight) of Example II, Part A were added 10.0 grams (2.0 parts by weight) of sisal fibers cut to ¼" lengths and 10.0 grams (2.0 parts by weight) of formic acid. The mixture was stirred until the formulation was homogeneous.

Example II, A-4

This formulation illustrates an alkali activated coating remover with fibers added in accordance with the present invention. To 480 grams (96 parts by weight) of Example II, Part A were added 10.0 grams (2.0 parts by weight) of sisal fibers cut to ¼" lengths and 10.0 grams (2.0 parts by weight) of 50 percent Sodium Hydroxide. The mixture was stirred until the formulation was homogeneous.

Example III

This example illustrates a Non Methylene Chloride solvent based Fiber containing paint remover.

Into a 2 liter stainless steel beaker were charged 480 grams (48.0 parts by weight) of Toluene. With agitation 10.0 grams (1.0 part by weight) of Hydroxy Propyl Cellulose, 10.0 grams (1.0 part by weight) of melted Paraffin wax and 50 grams (5.0 parts by weight) of Diatomaceous earth were added. While still stirring, 100 grams (10.0 parts by weight) of Acetone and 330 grams (33.0 parts by weight) of Methanol were added. After stirring for 15 minutes, an increase in viscosity was noted. To this viscous solution were added 20 grams (2.0 parts by weight) of sisal fibers cut to ¼" lengths. The mixture was agitated for 10 minutes until the fibers were evenly distributed throughout the formulation. The homogeneous solution had a viscosity of 6000 centipoises and a specific gravity of 0.855.

COATING REMOVAL TEST (CRT)

Comparison of Alkaline, Methylene Chloride Coating Removers with and without Fibers

CRT-1

Using a 2" paint brush, a sample of Example I, Part A was applied to 6"×6" area of a hood from a 1979 Ford automobile.

Using the same procedure, a sample of Example I, Part A-1 was applied to the same hood. The two formulas were allowed to dry overnight.

A plastic scraper was then used to remove both applications. The formula without the fibers required 8–10 strokes of the scraper removal. While most of the paint was removed, some powder residue from the Diatomaceous earth remained over about 25 percent of the area where the remover had been applied. The powdered residue of dried paint and paint remover required a broom and several minutes to be brushed into a pan for disposal. The particles ranged from a powder to ½" in size.

The remover of Example I, Part A-1, which had sisal fibers present had adhered to the paint and was removed from the metal in one piece. The amount of powdered residue left on the hood was about ⅛ of that left on the hood by the remover of Example I, Part A, which did not have the fibers. The ease of removal of the paint with the fiber-containing formula and the time saved in cleaning up the residue from the removal was a significant improvement over the conventional non-fiber containing paint remover.

CRT-2

The coating removal process described in CRT-1 was repeated using Formula A-2 from Example I. The results were almost identical to those described in CRT-1. The ¼" sisal fibers bound the deposed paint coating into one sheet that was easy to remove in one piece, and that could be picked up and thrown away.

No sweeping was needed after scraping.

CRT-3

The coating removal procedure described in CRT-1 was repeated except the Example I, A-3 formulation using ¼" Tampico fibers was used. The results were almost identical to those obtained in CRT-1 and CRT-2.

CRT-4

The coating removal process described in CRT-1 was repeated except ¼" Tampico fibers were used (See Example I, A-4). The results were almost identical to those described in CRT-1.

The following table summarizes the results of CRT 1 through 4 described above and CRT 5-14. Tests 5-14 were conducted in the same manner described in CRT-1.

ened from the overhead beam. The mixture of deposed paint and still wet coating remover was scraped away

| CRT # | Coating Remover Formula | Type of Fiber | Length of Fiber in Inches | Amount of Fiber by Weight | Amount of Paint Removed | Removal Form of Disposal | % Residue of Diatomaceous Earth on Surface |
|---|---|---|---|---|---|---|---|
| CRT-1 | I-A | None | — | — | 100 | powder | 25% |
| CRT-1 | I-A-1 | Sisal | ¼ | 2 | 100 | One Large Flake | 10% |
| CRT-2 | I-A-2 | Sisal | ½ | 2 | 100- | One Large Flake | 10% |
| CRT-3 | I-A-3 | Tampico | ¼ | 2 | 100 | One Flake | 10% |
| CRT-4 | I-A-4 | Tampico | ½ | 2 | 100 | One Flake | 10% |
| CRT-5 | I-A-5 | Tampico | ¼ | 1½ | 100 | One Flake | 10% |
| CRT-6 | I-A-6 | .010 diameter polypropylene | ¼ | 1½ | 100 | Two Flakes | 10% |
| CRT-7 | I-A-7 | .010 diameter polypropylene | ¼ | 2 | 100 | One Flake | 10% |
| CRT-8 | I-A-8 | .012 diameter polypropylene | ½ | 1½ | 100 | Three Flakes | 10% |
| CRT-9 | I-A-9 | .012 diameter polypropylene | ¼ | 3 | 100 | Two Flakes | 10% |
| CRT-10 | I-A-10 | .014 polyethylene | ¼ | 2 | 100 | Four Flakes | 10% |
| CRT-11 | I-A-11 | Fiberglass .06 microns wide .002 microns thick | ¼ | 2 | 100 | Three Flakes | 10% |
| CRT-12 | I-A-12 | Fiberglass as above | ½ | 2 | 100 | Four Flakes | 15% |
| CRT-13 | I-A-13 | Swine Hair | 1.0 | 2 | 100 | One Flake | 10% |
| CRT-14 | I-A-14 | Nylon | ¾ | 2 | 100 | Two Flakes | 10% |

CRT-15

This test compares neutral solvent based coating removers with and without fibers. A sample of Example II, Part A (no fibers) was painted on a round wooden chair leg that was coated with an alkyd paint. Another chair leg from the same chair was painted with a sample of Example II, Part A-1 (¼" Tampico fibers).

The coating remover formulas were allowed to dry overnight and then a metal scraper with a two inch blade was used to remove Example II, Part A from the chair leg. Due to the round structure of the leg and the flat plane of the scraper, only a few degrees of the leg's surface could be scraped at a time. The remover worked quite well but many strokes of the scraper were needed to scrape off the paint from the complete 360° around the chair leg. The chair was marked by many strokes of the scraper.

On the chair leg with the coating remover that contained the sisal fibers (Example II, Part A-1), only one light stroke of the scraper down the chair leg in a vertical direction was needed. The paint and dried coating remover were then peeled away by hand. Little or no damage to the chair leg by the scraper was noted. Only large flakes of paint and residue were present for clean-up and the disposal of the dried flakes to a trash can caused no environmental problems, such as can occur with paint removers that still have wet active solvents.

CRT-16

This test compares a fiber-containing coating remover with a non-fiber containing coating remover for use on overhead surfaces. With a 3" paint brush, Example I, Part A (a non-fiber containing Methylene Chloride-based remover) was applied onto a metal overhead beam that was coated with an alkyd paint. During the application of Example I, Part A, a large portion of the remover failed to cling to the overhead surface, thus potentially endangering the worker below. A sufficient time was allowed to elapse until the remover had loosened from the overhead beam. The mixture of deposed paint and still wet coating remover was scraped away from the beam using a metal scraper. During the removal, the worker used a vapor mask, safety glasses, protective clothing and gloves to safeguard himself against contact from the still wet, active solvents.

The waste material from the removal process was transferred from the floor into a vapor tight container to be removed by a licensed waste disposal company.

Example I, Part A-1 was applied in the same manner to the metal beam adjacent to the area where the non-fiber based coating remover test was carried out. The coating remover with the fibers did not drip from the surface of the beam as did the non-fiber containing coating remover. Instead all of the coating remover clung to the underside of the overhead beam. The fibers apparently acted as a barrier, keeping the coating remover evenly distributed on the surface of the beam.

This unique fiber barrier prevented the remover from accumulating in large enough concentrations to fall from the beam. No coating remover fell from the beam; therefore, more coating remover was available to depose the paint from the beam. The remover was allowed to dry and then scraped from the beam's surface using a 3" scraper.

Due to the fact that all the solvent had evaporated in the absence of the worker, no vapor mask was needed during the paint removal. Also, there was no need for any protective clothing since no wet, active solvents were present during removal.

Clean-up was simplified as the dried coating remover, which had adhered to the paint, came off in large flakes. The large flakes were picked up by hand and were able to be disposed of in a non-regulated container. The smaller flakes were easily cleaned by a vacuum cleaner.

Considerable economic savings were realized by use of the fiber remover because less safety equipment was needed, the clean-up time was reduced and no financial outlay was required for transport and disposal by a licensed disposal company.

CRT-17

Overhead Cling Test

The following test was carried out to substantiate precisely the observed improved overhead cling of a fiber containing remover over that of a remover that does not contain fibers.

To a 12×6" board that had been coated with four coats of enamel paint were applied 40 grams of Example I, Part A (no fibers). To another 12×6" pine board coated in the same way were applied 40 grams of Example I, Part A-1, which contained ¼" sisal fibers. Both boards were then immediately inverted and suspended over plastic drop cloths.

Again, as in CRT-16, all of the fiber-containing remover clung to the under side surface of the board and did not fall to the drop cloth below. However, a large portion of the non-fiber containing remover did fall to the drop cloth below. The drop cloth and fallen paint remover were weighed (10 minutes after applicaton to the board). The weight of the drop cloth was subtracted from the total weight and the amount of fallen paint remover was found to be over 75% of the original 40 grams of remover that had been applied to the board.

The coating removers were then allowed to dry and were then scraped from the surface of the boards. The non-fiber containing remover only removed the top two coats and about 50% of the third coat of paint on the board.

The fiber-containing coating removed all of the first three coats and had etched the fourth coat of paint. The paint was removed in one large flake. The improved cling power of the fiber containing remover allowed more remover to maintain a longer wet and active time period thus providing an increased amount of contact time with the paint. This improved cling and longer contact time was recognized as a novel and useful formulation.

The ease of removal and disposal of the one large flake was recognized as a novel and useful procedure for removing a coating and disposing of the coating.

CRT-18

The following test illustrates the ease of removal and effectiveness of a fiber-containing coating remover on concrete. 50 grams of Example I, part A-1 (fiber-containing coating remover with sisal fibers cut to ¼" lengths) were placed on a coated concrete floor. The coating on the concrete floor consisted of 3 coats of enamel and 2 coats of latex. In a 6'×6" area, the fiber-containing coating remover was applied using a 2" paint brush and brushed in one direction to evenly disperse the fibers. The fiber-containing coating remover was allowed to dry and the deposed coating was scraped from the concrete floor using a 3" plastic paint scraper. The fiber-containing coating remover and deposed paint were removed in one complete piece and all the paint layers were removed.

CRT-19

This test illustrates the ease of removal and effectiveness of a fiber-containing coating removal on glass. 30 grams of Example I, Part A-1 (fiber-containing coating remover with sisal fibers cut to ¼" lengths) were placed on a coated piece of glass. The glass was coated with a two-component pigmentedurethane system. The urethane portion consisted of a Toluene diisocyanate and the pigmented portion consisted of an acrylic enamel. The paint is used on many other surfaces such as cars, trucks and boats.

In a 3"×3" area, the fiber-containing coating remover was applied using a 2" paint brush and brushed in one direction to evenly disperse the fibers. The fiber-containing coating remover was then allowed to dry. Then the dried fiber-containing coating remover and deposed coating were scraped from the glass using a 3" plastic scraper. The fiber-containing coating remover and deposed paint were removed in one complete piece, removing all the paint layers to the bare glass.

CRT-20

This test illustrates the ease of removal and effectiveness of a fiber-containing coating remover on brick. 50 grams of Example I, Part A-1 (fiber-containing remover with sisal fibers cut to ¼ inch lengths) were placed on brick containing 3 layers of acrylic latex house paint.

In a 6"×6" area, the fiber-containing cotaing remover was applied using a 2" paint brush and brushed in one direction to evenly disperse the fibers. The fiber-containing coating remover was allowed to dry. The dried fiber-containing coating remover and deposed coating were scraped from the brick using a 3" plastic scraper. The fiber-containing coating remover and deposed paint were removed in one complete piece, removing all the paint layers to expose the bare brick.

CRT-21

This test illustrates the ease of removal and effectiveness of a fiber-containing coating remover on fiberglass. 50 grams of Example III, a non-Methylene Chloride Solvent based fiber-containing coating remover with sisal fibers cut to ¼" lengths, were placed on a fiberglass car fender coated with a automotive lacquer finish.

In a 6"×6" area, the fiber-containing coating remover was applied with a 2" paint brush and brushed in one direction to evenly disperse the fibers. The fiber-containing coating remover was allowed to dry. The deposed paint and remover were scraped from the fiberglass surface using a 3" plastic paint scraper. The dried fiber-containing coating remover and deposed paint were removed in one complete piece down to the bare fiberglass with no apparent damage to the fiberglass.

CRT-22

This test illustrates the ease of removal and effectiveness of a fiber-containing coating remover on aluminum. 15 grams of Example IA-15, a fiber-containing coating remover with corrosion inhibitors, were placed on a 3"×5" #1100 aluminum coupon coated with an alkyd paint. #1100 aluminum is specified as the substrate in the military paint removal test MIL-R-251348 (U.S.A.F.). The coating remover was applied to the aluminum coupon with a 2" paint brush and allowed to dry. Then the dried fiber-containing coating remover and deposed coating were scraped from the coupon using a 2 inch plastic scraper. The fiber-containing coating remover and deposed paint were removed in one complete piece, and all the paint was removed. The aluminum coupon was then inspected for any signs of attack by the coating remover. The coupon was found to be free of any damage such as etching and pitting.

What is claimed is:

1. A peelable solvent-based coating remover for removing a coating from a coated substrate comprising:

a solvent-based coating remover containing (a) a binder; (b) a solvent; and (c) fibers in an amount from about 1.5% to 2.5% by weight of said fiber-containing solvent-based coating remover.

2. A peelable solvent-based coating remover as recited in claim 1, wherein said remover dries without substantial readhesion of said coating to said coated substrate.

3. A peelable solvent-based coating remover as recited in claim 1, wherein said coating clings to the underside of a horizontal substrate or to a vertical substrate substantially without dripping.

4. A peelable solvent-based coating remover as recited in claim 1 wherein said fibers are selected from the group consisting of sisal, tampico, swinehair, polypropylene, polyethylene, fiberglass, nylon, textile fibers, wool, cotton and corn silk.

5. A peelable solvent-based coating remover as recited in claim 1 wherein said solvent-based coating remover includes an activating agent selected from the group consisting of ammonia, phenol, acid and alkali.

6. A peelable solvent-based coating remover as recited in claim 5 wherein said fibers are selected from the group consisting of sisal, tampico, swinehair, polypropylene, polyethylene, fiberglass, nylon, textile fibers, wool, cotton and corn silk.

7. A peelable solvent-based coating remover as recited in claim 1 wherein said fibers are present in an amount from about 1.5% to 2.0% by weight of said fiber-containing solvent-based coating remover.

8. A peelable solvent-based coating remover as recited in claim 7 wherein said fibers are from about ¼" long to 1" long.

9. A peelable solvent-based coating remover as recited in claim 1 wherein said fibers are from about 1/16" to 5.0" long.

10. A peelable solvent-based coating remover as recited in claim 9 wherein said fibers are from about ¼" to 1" long.

11. A peelable solvent-based coating remover as recited in claim 1 wherein said binder is selected from the group consisting of hydrocarbon resin, methyl styrene/vinyl toluene copolymer and hydrogenated petroleum resin.

12. A peelable solvent-based coating remover as recited in claim 1 wherein said solvent-based coating remover further includes an evaporation retarder, a wetting agent and a viscosity builder.

13. A peelable solvent-based coating system as recited in claim 11 wherein said solvent-based coating further includes nn evaporation retarder, a wetting agent and a viscosity builder.

14. A peelable solvent-based coating remover as recited in claim 13 wherein said solvent-based coating further includes a corrosion inhibitor.

15. A peelable solvent-based coating remover as recited in claim 12 wherein said solvent-based coating further includes a corrosion inhibitor.

16. A peelable solvent-based system as recited in claim 15 wherein said corrosion inhibitor is a combination of lithium chromate and sodium chromate.

17. A peelable solvent-based coating remover as recited in claim 14, wherein said corrosion inhibitor is a combination of lithium chromate and sodium chromate.

18. A peelable solvent-based coating remover comprising:
75.3 parts by weight methylene chloride;
5.0 parts by weight toluene;
1.0 parts by weight hydrocarbon resin;
1.7 parts by weight hydroxymethyl cellulose;
1.0 parts by weight paraffin wax;
5.1 parts by weight diatomaceous earth;
2.07 parts by weight ammonium hydroxide;
3.9 parts by weight methyl alcohol;
5.0 parts by weight isopropyl alcohol; and
2.0 parts by weight fiber.

19. A process for making a peelable solvent-based coating remover comprising the steps of:
adding fiber to a coating remover containing a binder and a solvent, said fibers being present in an amount from about 1.5% to 2.5% by weight of said fiber-containing solvent-based coating remover.

20. A process as recited in claim 19 wherein said remover dries without substantial readhesion of said coating to said coated substrate.

21. A process as recited in claim 19 wherein said fiber is present in an amount from about 1.5%-2.0% by weight of said fiber-containing solvent-based coating remover.

22. A process as recited in claim 21 wherein said fibers are from about ¼" to 1.0" long.

23. A process as recited in claim 19, wherein said coating remover containing said binder and a solvent is thickened, followed by adding said fiber to said thickened coating remover.

24. A process for removing a coating from a coated substrate comprising the steps of (a) applying to said coated substrate the solvent-based coating remover of claim 1 in an amount sufficient to remove said coating; (b) drying said solvent based coating to provide a dry combination of removed coating and solvent-based coating remover without more than about 10%-20% readhesion of said coating to said substrate; and (c) peeling said dry combination from said substrate.

25. A peelable solvent-based coating remover as recited in claim 1, wherein said fibers are selected from the group consisting of sisal and tampico.

26. A peelable solvent-based coating remover as recited in claim 25, wherein said fiber is sisal.

27. a peelable solvent-based coating remover as recited in claim 7, wherein said fibers are selected from the group consisting of sisal and tampico.

28. A peelable solvent-based coating remover as recited in claim 27, wherein said fiber is sisal.

* * * * *

UNITED STATES PATENT AND TRADEMARK OFFICE
CERTIFICATE OF CORRECTION

PATENT NO. : 4,801,397
DATED : January 31, 1989
INVENTOR(S) : KENNETH J. FLANAGAN et al.

It is certified that error appears in the above-identified patent and that said Letters Patent is hereby corrected as shown below:

In claim 3:

Column 15, line 55

"nn" should read "an"

Signed and Sealed this

First Day of August, 1989

*Attest:*

DONALD J. QUIGG

*Attesting Officer*    *Commissioner of Patents and Trademarks*